United States Patent
DiFrancesco et al.

(10) Patent No.: US 10,822,983 B2
(45) Date of Patent: Nov. 3, 2020

(54) HYDROSTATIC SEAL WITH ABRADABLE TEETH FOR GAS TURBINE ENGINE

(71) Applicant: United Technologies Corporation, Farmington, CT (US)

(72) Inventors: Michael L. DiFrancesco, Waterbury, CT (US); Tara L. D'Ambruoso, Oxford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 92 days.

(21) Appl. No.: 15/889,551

(22) Filed: Feb. 6, 2018

(65) Prior Publication Data
US 2020/0025097 A1    Jan. 23, 2020

(51) Int. Cl.
    F01D 11/02    (2006.01)
    F01D 11/00    (2006.01)
    F01D 11/08    (2006.01)
    F01D 11/12    (2006.01)
    F16J 15/44    (2006.01)
    F16J 15/447   (2006.01)

(52) U.S. Cl.
    CPC .......... *F01D 11/025* (2013.01); *F01D 11/001* (2013.01); *F01D 11/08* (2013.01); *F01D 11/12* (2013.01); *F16J 15/44* (2013.01); *F16J 15/441* (2013.01); *F16J 15/442* (2013.01); *F16J 15/447* (2013.01)

(58) Field of Classification Search
    CPC ........ F01D 5/20; F01D 11/001; F01D 11/025; F01D 11/08; F01D 11/12; F16J 15/44; F16J 15/441; F16J 15/442; F16J 15/447; F16J 15/453
    See application file for complete search history.

(56) References Cited

U.S. PATENT DOCUMENTS 4,184,722 A * 1/1980 Henniges ................ B61F 15/02
                                                  384/162
4,863,342 A * 9/1989 Nordstrom ............. F01D 9/042
                                                  415/134
(Continued)

FOREIGN PATENT DOCUMENTS

CN    201671662 U   * 12/2010
GB    191013939 A   *  9/1910   ............. B60B 35/04
(Continued)

OTHER PUBLICATIONS

Gas turbines—Wikipedia, the free encyclopedia, 2014 (Year: 2014).*
(Continued)

*Primary Examiner* — Richard A Edgar
*Assistant Examiner* — Maranatha Boardman
(74) *Attorney, Agent, or Firm* — Cantor Colburn LLP

(57) ABSTRACT

A hydrostatic seal assembly includes a seal support, a seal shoe integral to the seal support and radially movable relative to the seal support. A plurality of seal teeth are located at a radially inboard surface of the seal shoe. The seal shoe is formed from a first material and the radially inboard surface is formed from a second material softer than the first material such that the radially inboard surface is abradable in the event of a rub between the radially inboard surface and an adjacent rotating component.

20 Claims, 4 Drawing Sheets

(56) References Cited

U.S. PATENT DOCUMENTS

| | | | | |
|---|---|---|---|---|
| 4,909,706 | A * | 3/1990 | Bergsten | F01D 11/025 |
| | | | | 277/412 |
| 5,639,095 | A | 6/1997 | Rhode | |
| 5,769,604 | A * | 6/1998 | Gardner | F16J 15/3412 |
| | | | | 277/306 |
| 6,840,519 | B2 * | 1/2005 | Dinc | F16J 15/445 |
| | | | | 277/303 |
| 7,410,173 | B2 * | 8/2008 | Justak | F01D 11/00 |
| | | | | 277/355 |
| 7,896,352 | B2 * | 3/2011 | Justak | F16J 15/442 |
| | | | | 277/411 |
| 7,909,335 | B2 | 3/2011 | Turnquist et al. | |
| 8,002,285 | B2 * | 8/2011 | Justak | F01D 11/02 |
| | | | | 277/412 |
| 8,172,232 | B2 * | 5/2012 | Justak | F16J 15/442 |
| | | | | 277/411 |
| 8,408,558 | B2 * | 4/2013 | Reum | F16J 15/0887 |
| | | | | 277/615 |
| 8,641,045 | B2 * | 2/2014 | Justak | F16J 15/442 |
| | | | | 277/412 |
| 8,864,443 | B2 | 10/2014 | Narita et al. | |
| 8,974,201 | B2 * | 3/2015 | Oulman | F04B 7/0046 |
| | | | | 417/510 |
| 9,045,994 | B2 * | 6/2015 | Bidkar | F01D 11/02 |
| 9,746,085 | B2 | 8/2017 | Bode | |
| 10,030,531 | B2 * | 7/2018 | Peters | F03B 3/12 |
| 10,184,347 | B1 * | 1/2019 | D'Ambruoso | F01D 11/003 |
| 10,337,621 | B2 * | 7/2019 | D'Ambruoso | F16J 15/441 |
| 2009/0033037 | A1 * | 2/2009 | Varanasi | F01D 11/005 |
| | | | | 277/355 |
| 2012/0211944 | A1 | 8/2012 | Nishimoto et al. | |
| 2014/0008871 | A1 * | 1/2014 | Bidkar | F16J 15/447 |
| | | | | 277/303 |
| 2016/0084102 | A1 | 3/2016 | Pabla et al. | |
| 2017/0248236 | A1 | 8/2017 | Simpson et al. | |
| 2018/0363562 | A1 * | 12/2018 | Chuong | F02C 7/28 |
| 2019/0017403 | A1 * | 1/2019 | Chuong | F01D 11/025 |
| 2019/0017404 | A1 * | 1/2019 | Chuong | F01D 11/10 |
| 2019/0017606 | A1 * | 1/2019 | Chuong | F01D 11/025 |
| 2019/0093495 | A1 * | 3/2019 | Chuong | F01D 11/025 |
| 2019/0101014 | A1 * | 4/2019 | DiFrancesco | F01D 11/02 |
| 2019/0203842 | A1 * | 7/2019 | Bidkar | F16J 15/4476 |
| 2019/0218926 | A1 * | 7/2019 | DiFrancesco | F01D 11/025 |
| 2019/0218927 | A1 * | 7/2019 | DiFrancesco | F01D 11/025 |

FOREIGN PATENT DOCUMENTS

| | | | | |
|---|---|---|---|---|
| GB | 2076480 | A * | 12/1981 | F16J 15/40 |
| JP | 2002228013 | A | 8/2002 | |
| JP | 2002323144 | A | 11/2002 | |

OTHER PUBLICATIONS

European Search Report Issued in EP Application No. 18210853.0, dated Jul. 2, 2019, 27 Pages.

* cited by examiner

HYDROSTATIC SEAL WITH ABRADABLE TEETH FOR GAS TURBINE ENGINE

STATEMENT OF FEDERAL SUPPORT

This invention was made with Government support awarded by the United States. The Government has certain rights in the invention.

BACKGROUND

Exemplary embodiments pertain to the art of gas turbine engines, and more particularly to seal assemblies for gas turbine engines.

In a gas turbine engine, a number of components rotate about an engine central longitudinal axis relative to static components under tight tolerances. For example, the compressor and turbine sections of the gas turbine engine include rotating rotors having radially outwardly extending rotor blades. The rotor rotates relative to a stator with a small annular gap therebetween. To increase efficiency of the gas turbine engine, it is important that such small gaps be maintained to limit leakage through the gap, but to also allow for rotation of the rotor relative to the stator.

Seals are often utilized to manage leakage through the gaps. Such seals are fixed to the stator and may be contact seals, such as brush seals, while others may be non-contact seals such as hydrostatic seals. Some hydrostatic seals are configured with a shoe having radial travel in response to a pressure differential across the seal. Such seals are capable of only a limited amount of radial travel at a given seal size.

During normal engine operation, the engine rotating hardware experiences limited deflections, but may experience greater deflections during, for example, emergency maneuver operation. If the seal is not configured to handle such maneuver deflections, a rub between the seal shoe and the rotating hardware may occur, damaging both the seal and the rotating hardware.

BRIEF DESCRIPTION

In one embodiment, a hydrostatic seal assembly includes a seal support, a seal shoe integral to the seal support and radially movable relative to the seal support. A plurality of seal teeth are located at a radially inboard surface of the seal shoe. The seal shoe is formed from a first material and the radially inboard surface is formed from a second material softer than the first material such that the radially inboard surface is abradable in the event of a rub between the radially inboard surface and an adjacent rotating component.

Additionally or alternatively, in this or other embodiments the second material is a metal alloy.

Additionally or alternatively, in this or other embodiments the second material is tin or lead based babbitt material.

Additionally or alternatively, in this or other embodiments a seal surface between adjacent seal teeth of the plurality of seal teeth is formed from the second material.

Additionally or alternatively, in this or other embodiments the radially inboard surface is formed via a coating process.

Additionally or alternatively, in this or other embodiments the radially inboard surface is formed via one or more of a spray, plating or dip process.

Additionally or alternatively, in this or other embodiments one or more seal beams connect the seal support to the seal shoe.

In another embodiment, a turbine section of a gas turbine engine includes a turbine stator, a turbine rotor configured to rotate about an engine central longitudinal axis relative to the turbine stator, and a hydrostatic seal assembly fixed to the turbine stator. The hydrostatic seal assembly includes a seal support, a seal shoe integral to the seal support and radially movable relative to the seal support, and a plurality of seal teeth located at a radially inboard surface of the seal shoe and defining an annular seal gap between the hydrostatic seal assembly and the turbine rotor. The seal shoe is formed from a first material and the radially inboard surface is formed from a second material softer than the first material such that the radially inboard surface is abradable in the event of a rub between the radially inboard surface and the turbine rotor during operation of the turbine section.

Additionally or alternatively, in this or other embodiments the second material is a metal alloy.

Additionally or alternatively, in this or other embodiments the second material is tin or lead based babbitt material.

Additionally or alternatively, in this or other embodiments a seal surface between adjacent seal teeth of the plurality of seal teeth is formed from the second material.

Additionally or alternatively, in this or other embodiments the radially inboard surface is formed via a coating process.

Additionally or alternatively, in this or other embodiments the radially inboard surface is formed via one or more of a spray, plating or dip process.

Additionally or alternatively, in this or other embodiments one or more seal beams connect the seal support to the seal shoe.

In yet another embodiment, a gas turbine engine includes a combustor, and a turbine section in fluid communication with the combustor. The turbine section includes a turbine stator, a turbine rotor configured to rotate about an engine central longitudinal axis relative to the turbine stator, and a hydrostatic seal assembly fixed to the turbine stator. The hydrostatic seal assembly includes a seal support, a seal shoe integral to the seal support and radially movable relative to the seal support, and a plurality of seal teeth located at a radially inboard surface of the seal shoe and defining an annular seal gap between the hydrostatic seal assembly and the turbine rotor. The seal shoe is formed from a first material and the radially inboard surface is formed from a second material softer than the first material such that the radially inboard surface is abradable in the event of a rub between the radially inboard surface and the turbine rotor during operation of the turbine section.

Additionally or alternatively, in this or other embodiments the second material is a metal alloy.

Additionally or alternatively, in this or other embodiments the second material is tin or lead based babbitt material.

Additionally or alternatively, in this or other embodiments a seal surface between adjacent seal teeth of the plurality of seal teeth is formed from the second material.

Additionally or alternatively, in this or other embodiments the radially inboard surface is formed via a coating process.

Additionally or alternatively, in this or other embodiments the radially inboard surface is formed via one or more of a spray, plating or dip process.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
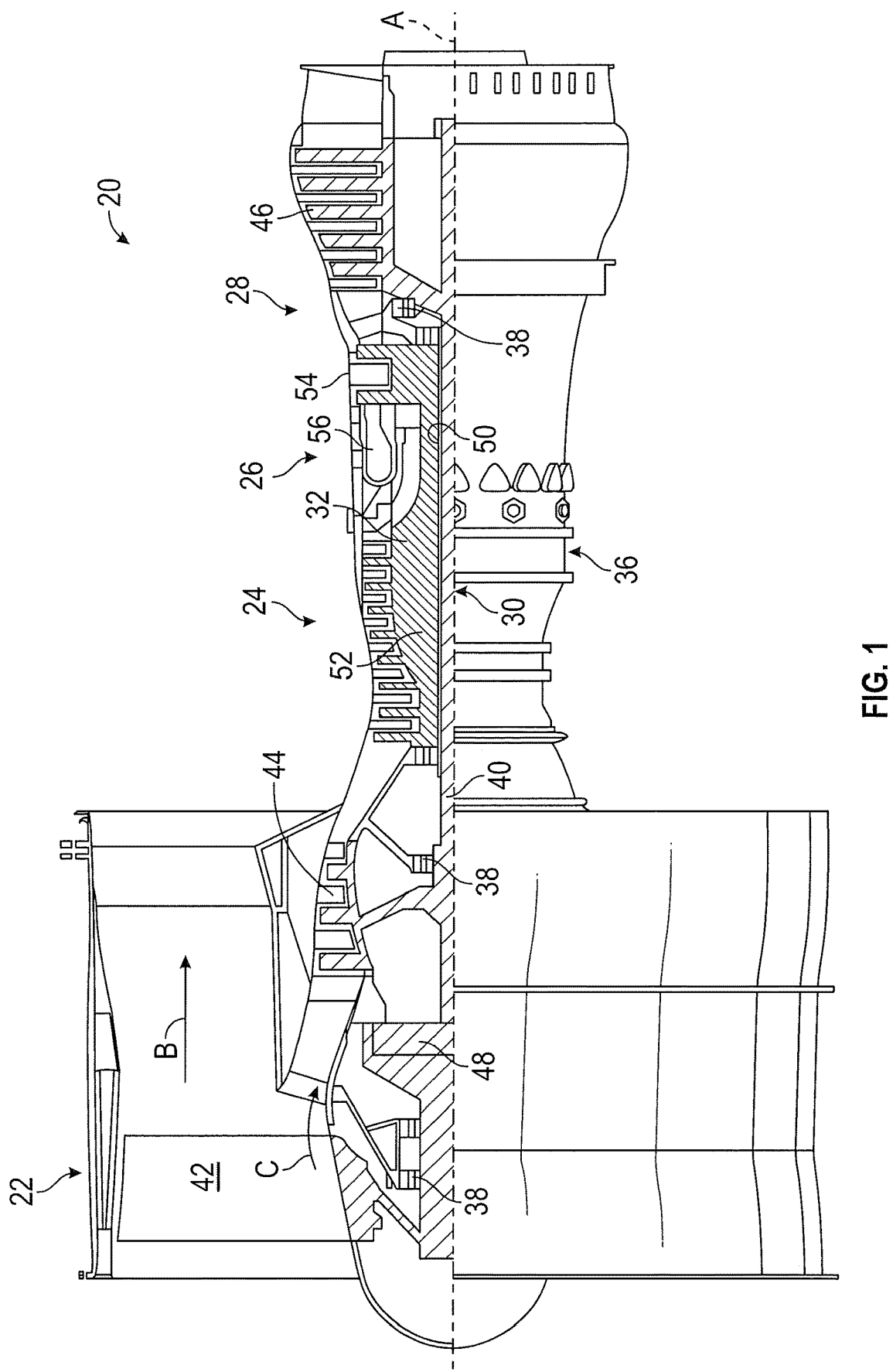
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including, for example, one spool or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about Mach 0.8 and about 35,000 feet (10,688 meters). The flight condition of Mach 0.8 and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
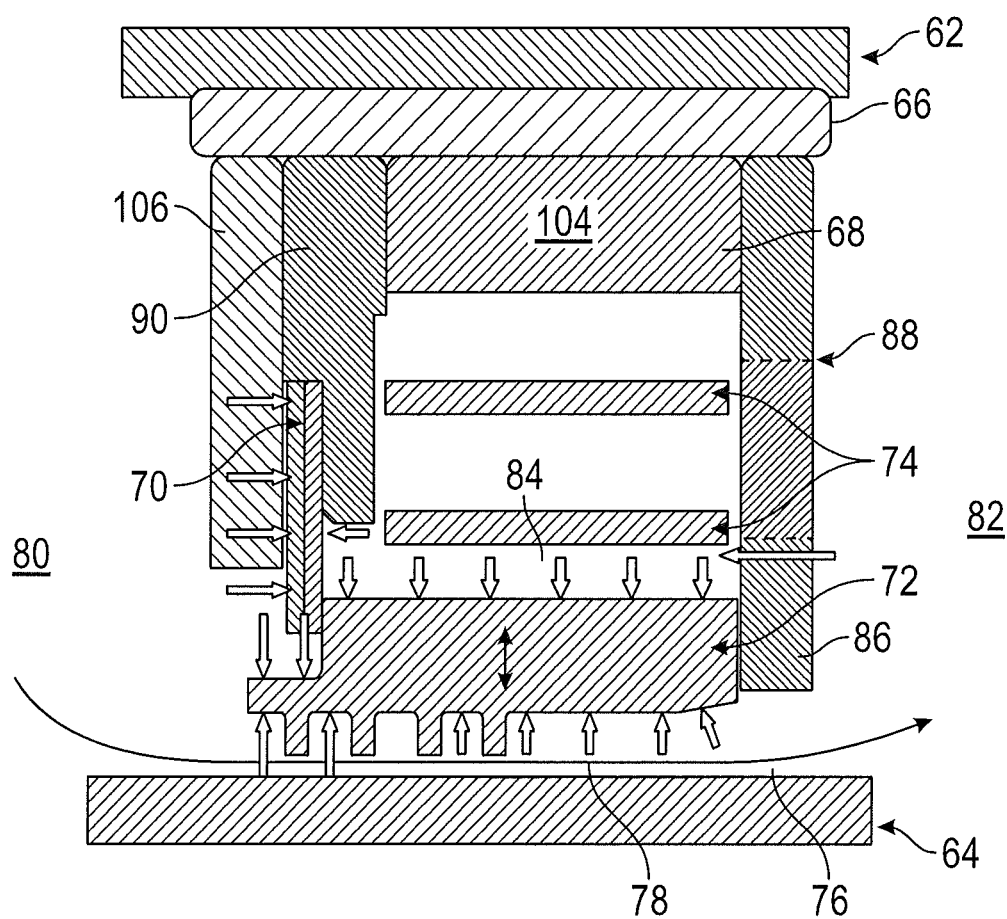
FIG. 2 is a cross-sectional view of an embodiment of a hydrostatic seal assembly for a gas turbine engine.

Referring now to FIG. 2, an embodiment of a seal 60 between a turbine stator 62 and a turbine rotor 64 is shown. The turbine rotor 64 is configured to rotate about the engine central longitudinal axis A relative to the turbine stator 62. While the description herein relates to sealing between a turbine stator and a turbine rotor, one skilled in the art will readily appreciate that the present disclosure may be readily applied at other locations of the gas turbine engine to provide sealing between a rotating component and a stationary component.

Figure 3:
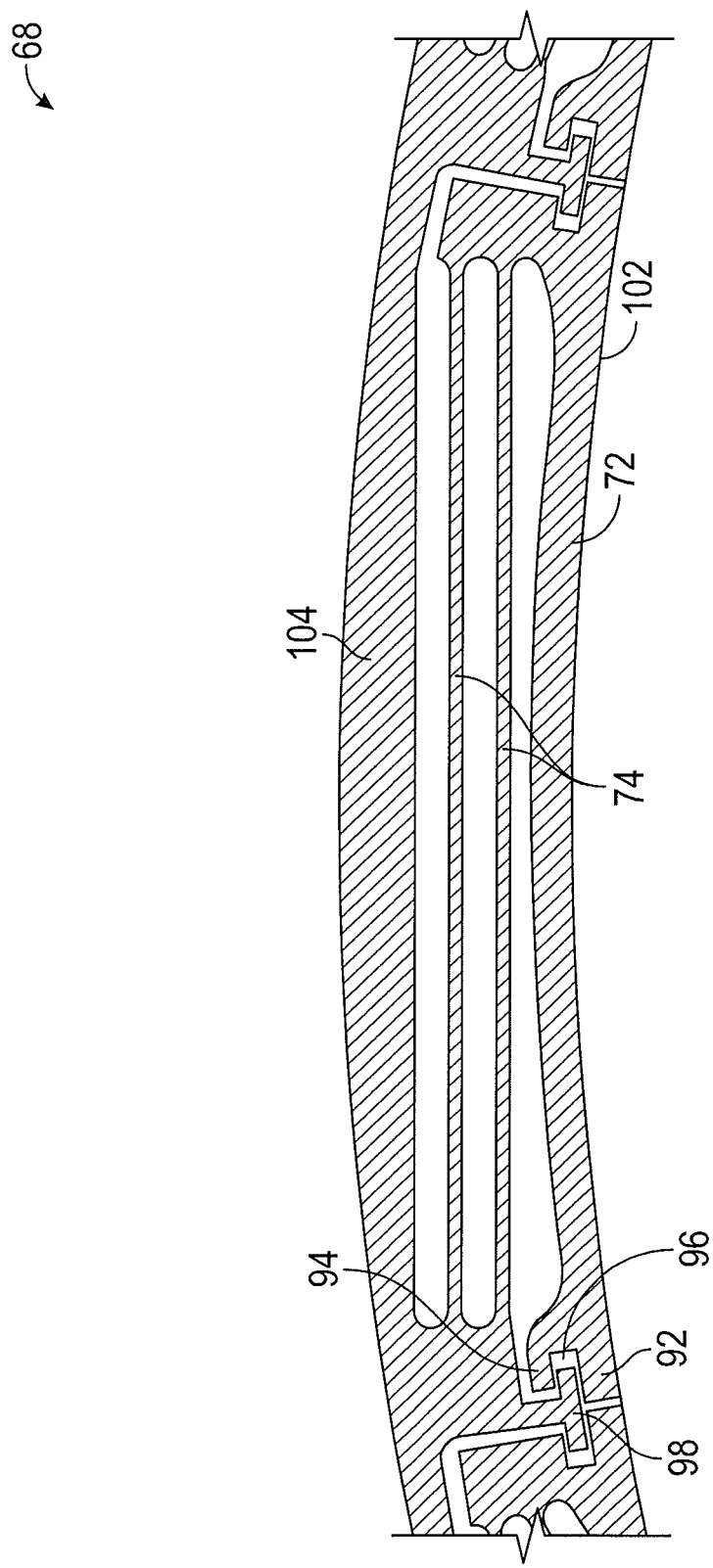
FIG. 3 is another cross-sectional view of an embodiment of a hydrostatic seal assembly for a gas turbine engine.

The seal 60 is fixed to the turbine stator 62 via a seal carrier 66 and includes a primary seal 68 and one or more secondary seals 70. The primary seal 68 includes a seal support 104, which supports a seal shoe 72 via one or more seal beams 74 which, as shown best in FIG. 3, are configured as spring elements integral with the seal support 104 and the seal shoe 72. Referring again to FIG. 2, the seal shoe 72 is radially moveable relative to the seal support 104, and radially the toward the turbine stator 62 and radially away from the turbine stator 62 to maintain a desired air gap 76 between the turbine rotor 64 and the seal shoe 72.

In operation, an airflow 78 flows through the air gap 76 from a high pressure area 80 upstream of the seal 60 toward a low pressure area 82 downstream of the seal 60. Further, airflow enters a seal cavity 84 radially outboard of the seal shoe 72 via one or more plate openings 86 in a scalloped plate 88, which is downstream of the seal shoe 72 and in some embodiments axially abuts the seal shoe 72. The secondary seals 70 are located upstream of the seal shoe 72 and in some embodiments abut the seal shoe 72. The secondary seal 70 prevents airflow from entering the seal cavity 84 from the high pressure area 80 and/or prevents airflow from exiting the seal cavity 84 via an upstream side of the seal 60. In some embodiments, the secondary seals 70 are axially retained at the seal shoe 72 by a secondary seal cover 106 upstream of the secondary seals 70. Further, a radial position of the secondary seal 70 may be maintained by a spacer 90. The seal shoe 72 moves radially until a pressure equilibrium between the air gap 76 and the seal cavity 84 is reached.

Referring again to FIG. 3, the primary seal 68 has a plurality of circumferentially spaced and segmented seal shoes 72. The radial travel or movement of the seal shoes 72 is limited by features of the primary seal 68. For example, the seal shoe includes a radially inboard arm 92 and a radially outboard arm 94 separated by an arm gap 96. A seal shoulder 98 of the primary seal 68 is disposed in the arm gap 96. Radial clearance between the seal shoulder 98 and the radially inboard arm 92 limits radially outward travel or movement of the seal shoe 72, while radial clearance between the seal shoulder 98 and the radially outboard arm 94 limits radially inward travel or movement of the seal shoe 72.

Figure 4:
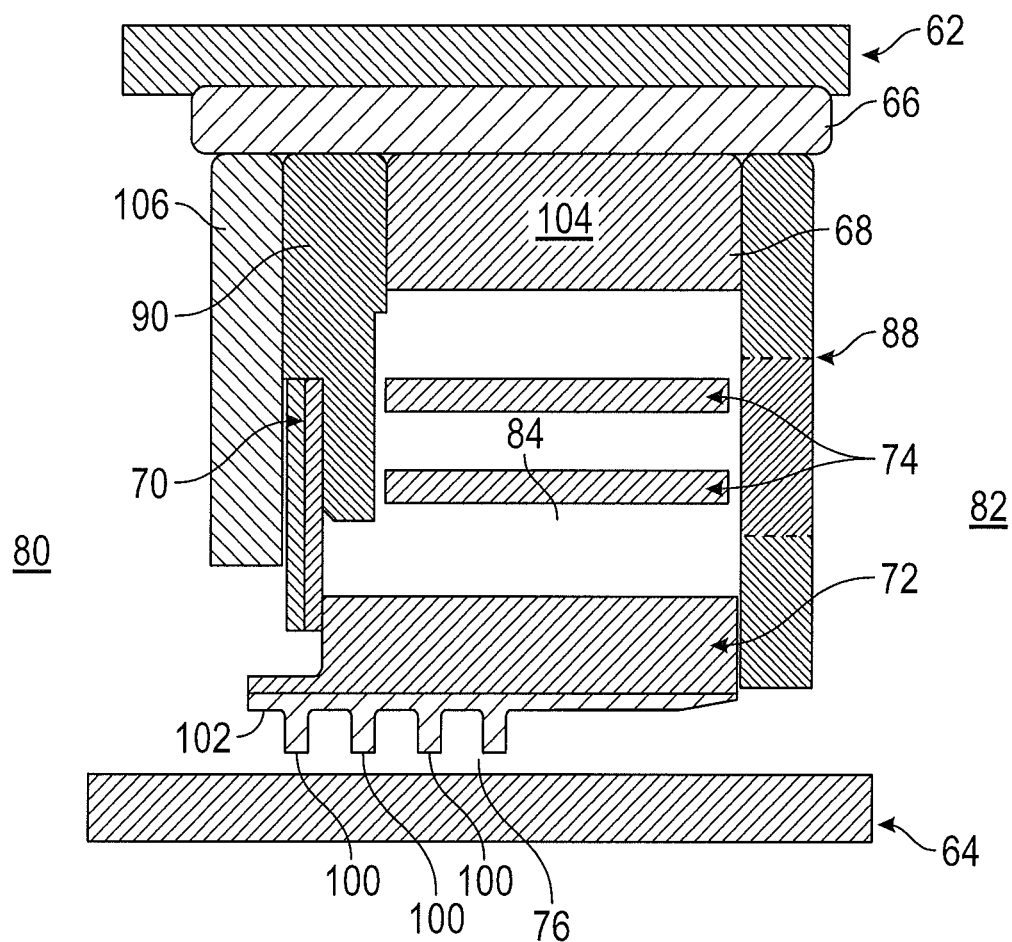
FIG. 4 is a cross-sectional view of an embodiment of a seal shoe having a plurality of seal teeth of a hydrostatic seal assembly.

Referring now to FIG. 4, the seal shoe 72 includes a plurality of shoe teeth 100 at a radially inboard side 102 of the seal shoe 72. The seal shoe 72 is formed from a first material, while the plurality of shoe teeth 100 are formed from a second material, softer than the first material so as to be a sacrificial, abradable component in the event of a rub between the seal shoe 72 and the turbine rotor 64. In some embodiments, the inboard side 102 between adjacent shoe teeth 100 are also formed from the second material. In some embodiments, the second material is applied to the seal shoe 72 via a coating process such as a spray, plating or dip process. In an embodiment, the second material is a babbitt material, a soft, white non-ferrous alloy, using, for example tin or lead as a base. It is to be appreciated that the use of babbitt materials for the second material is merely exemplary. In other embodiments, other materials such as hexagonal form boron nitride or a porous ceramic material may be utilized. In the event of a rub, damage will not occur to the turbine rotor 64 and the seal teeth 100 and/or the seal shoe 72 can be replaced via maintenance operations. Tolerances of the air gap may be reduced, since the shoe teeth 100 are applied via a coating process to a fixed portion of the seal shoe 72. Further, the use of the second material allows design of the seal 60 to be determined by steady-state, normal operation of the gas turbine engine, and does not need be optimized based on an unlikely event such as a rub due to emergency maneuver operations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal assembly, comprising:
   a seal support;
   a seal shoe integral to the seal support and radially movable relative to the seal support;
   a plurality of seal teeth disposed at a radially inboard surface of the seal shoe;
   a secondary seal located upstream of the seal shoe, the secondary seal configured to prevent airflow to and/or from a seal cavity located radially outboard of the seal shoe at an upstream side of the seal assembly; and
   a scalloped plate disposed downstream of the seal shoe, the scalloped plate including one or more openings formed therein to admit airflow into the seal cavity radially outboard of the seal shoe;
   wherein the seal shoe is formed from a first material and the radially inboard surface is formed from a second material softer than the first material such that the radially inboard surface is abradable in the event of a rub between the radially inboard surface and an adjacent rotating component.

2. The hydrostatic seal of claim 1, wherein the second material is a metal alloy.

3. The hydrostatic seal of claim 1, wherein the second material is tin or lead based babbitt material.

4. The hydrostatic seal of claim 1, wherein a seal surface between adjacent seal teeth of the plurality of seal teeth is formed from the second material.

5. The hydrostatic seal of claim 1, wherein the radially inboard surface is formed via a coating process.

6. The hydrostatic seal of claim 1, wherein the radially inboard surface is formed via one or more of a spray, plating or dip process.

7. The hydrostatic seal of claim 1, further comprising one or more seal beams connecting the seal support to the seal shoe.

8. A turbine section of a gas turbine engine, comprising:
   a turbine stator;
   a turbine rotor configured to rotate about an engine central longitudinal axis relative to the turbine stator; and
   a hydrostatic seal assembly fixed to the turbine stator comprising:
      a seal support;
      a seal shoe integral to the seal support and radially movable relative to the seal support;

a plurality of seal teeth disposed at a radially inboard surface of the seal shoe;

a secondary seal located upstream of the seal shoe, the secondary seal configured to prevent airflow to and/or from a seal cavity located radially outboard of the seal shoe at an upstream side of the seal assembly; and a scalloped plate disposed downstream of the seal shoe, the scalloped plate including one or more openings formed therein to admit airflow into the seal cavity radially outboard of the seal shoe;

wherein the seal shoe is formed from a first material and the radially inboard surface is formed from a second material softer than the first material such that the radially inboard surface is abradable in the event of a rub between the radially inboard surface and the turbine rotor during operation of the turbine section.

9. The turbine section of claim 8, wherein the second material is a metal alloy.

10. The turbine section of claim 8, wherein the second material is tin or lead based babbitt material.

11. The turbine section of claim 8, wherein a seal surface between adjacent seal teeth of the plurality of seal teeth is formed from the second material.

12. The turbine section of claim 8, wherein the radially inboard surface is formed via a coating process.

13. The turbine section of claim 8, wherein the radially inboard surface is formed via one or more of a spray, plating or dip process.

14. The turbine section of claim 8, further comprising one or more seal beams connecting the seal support to the seal shoe.

15. A gas turbine engine, comprising:
a combustor;
a turbine section in fluid communication with the combustor, the turbine section comprising:
a turbine stator;
a turbine rotor configured to rotate about an engine central longitudinal axis relative to the turbine stator; and
a hydrostatic seal assembly fixed to the turbine stator comprising:
a seal support;
a seal shoe integral to the seal support and radially movable relative to the seal support;
a plurality of seal teeth disposed at a radially inboard surface of the seal shoe;
a secondary seal located upstream of the seal shoe, the secondary seal configured to prevent airflow to and/or from a seal cavity located radially outboard of the seal shoe at an upstream side of the seal assembly; and
a scalloped plate disposed downstream of the seal shoe, the scalloped plate including one or more openings formed therein to admit airflow into the seal cavity radially outboard of the seal shoe;
wherein the seal shoe is formed from a first material and the radially inboard surface is formed from a second material softer than the first material such that the radially inboard surface is abradable in the event of a rub between the radially inboard surface and the turbine rotor during operation of the turbine section.

16. The gas turbine engine of claim 15, wherein the second material is a metal alloy.

17. The gas turbine engine of claim 15, wherein the second material is tin or lead based babbitt material.

18. The gas turbine engine of claim 15, wherein a seal surface between adjacent seal teeth of the plurality of seal teeth is formed from the second material.

19. The gas turbine engine of claim 15, wherein the radially inboard surface is formed via a coating process.

20. The gas turbine engine of claim 15, wherein the radially inboard surface is formed via one or more of a spray, plating or dip process.

* * * * *